Dec. 11, 1945.  A. O. GEORGE  2,390,704
OUTBOARD MOTOR DOLLY
Filed Nov. 13, 1944
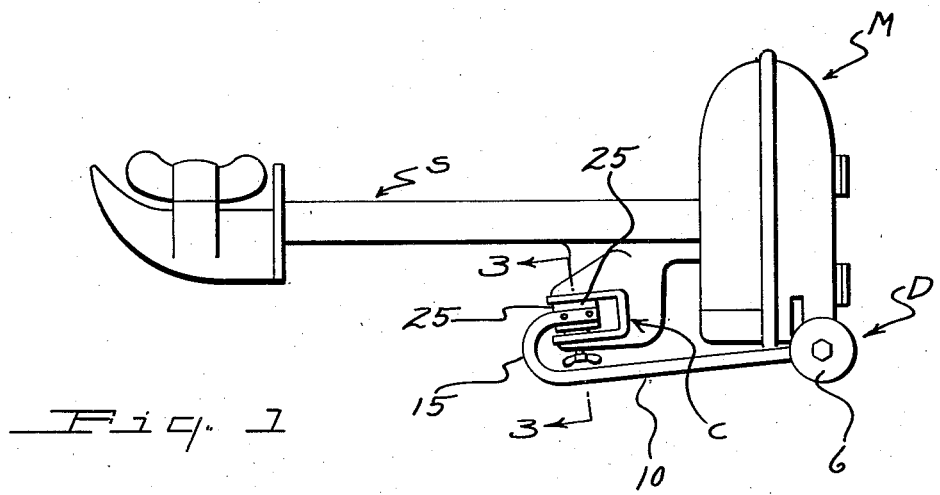
Fig. 1
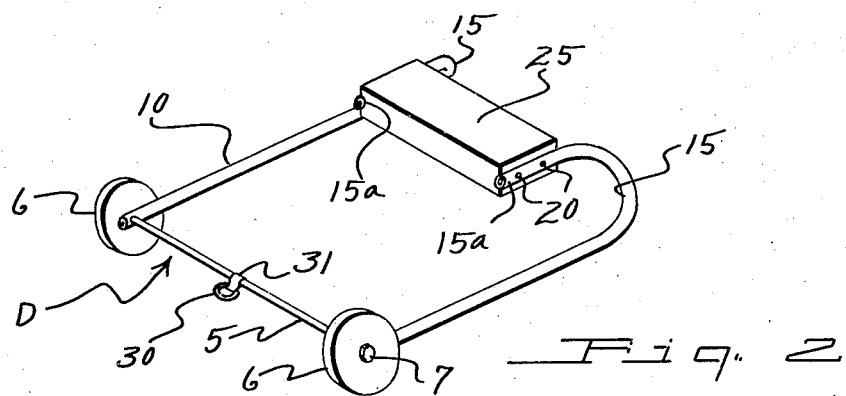
Fig. 2
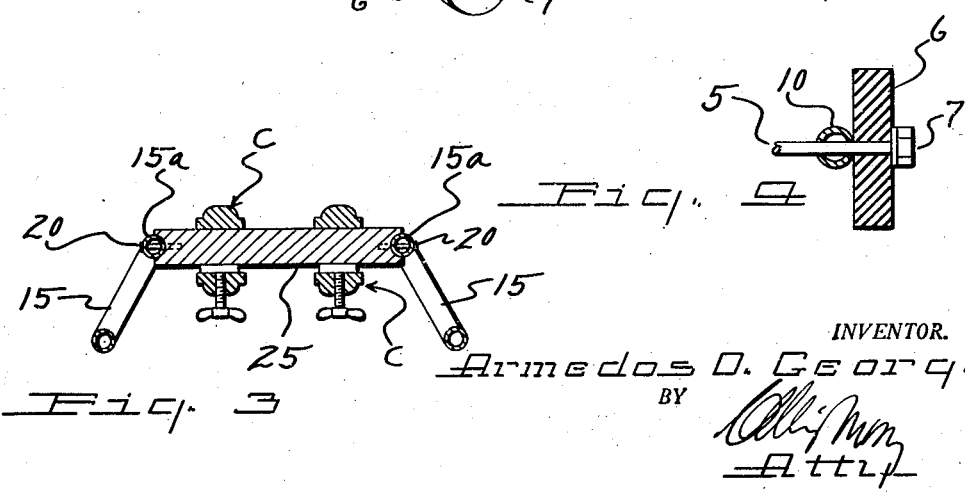
Fig. 3
Fig. 4
INVENTOR.
Armedos O. George
BY
Atty.

Patented Dec. 11, 1945

2,390,704

UNITED STATES PATENT OFFICE 2,390,704

OUTBOARD MOTOR DOLLY

Armedos O. George, North Hollywood, Calif.

Application November 13, 1944, Serial No. 563,182

3 Claims. (Cl. 280—61)

My invention has to do with dollies for mounting and transporting outboard motors.

A long existing difficulty in the use of outboard motors has been the task of carrying the motor to and from the place of use. Motors of this type are relatively heavy and usually must be transported over considerable distances before and after being installed on a boat. Heretofore, the task has required the strength of one or more persons, depending upon the size of the motor, first to lift the motor onto a truck or automobile, then to remove the motor therefrom, and to transport it from the truck to the boat, and vice versa. Also, while being transported, the motor is usually merely placed on the floor of the truck and frequently becomes damaged by being bounced around.

It is therefore an object of my invention to overcome those difficulties and provide a simple, economical and efficient dolly upon which the motor may be conveniently clamped in such position that it may be rolled from one place to another, using the propeller shaft as the handle, and which will secure the motor against injury during transportation.

My invention possesses still further features of novelty and advantage which will be readily understood from the following detailed description of one presently preferred embodiment which I have chosen for explanatory purposes, although I wish it understood that, within its broader scope as defined by the appended claims, the invention is capable of being carried out in other physical forms differing in detail from those now to be described.

For purposes of the following description I shall refer to the accompanying drawing, in which:

Fig. 1 is a side elevation showing an outboard motor mounted upon my dolly;

Fig. 2 is a perspective view;

Fig. 3 is an enlarged section on line 3—3 of Fig. 1; and

Fig. 4 is an enlarged fragmentary section showing the wheel and axle mounting.

Referring now to the drawing, I show in Fig. 1 a conventional outboard motor M mounted upon a dolly D.

The dolly is comprised of an axle 5 upon the respective ends of which I rotatably mount wheels 6, each of the wheels being secured on the axle by a nut 7.

A pair of side bars 10 are provided, each having a transverse opening 11 through which an end of the axle projects and each providing an abutment to prevent movement of a wheel longitudinally inwardly along the axle.

Adjacent their outer, or right-hand, ends each of the side bars is formed into a U-shaped portion 15, the bent portions 15 converging inwardly towards each other so that their extreme outer end portions 15a are parallel but are spaced apart a lesser distance than are the opposite portions 10 of the bar.

Secured between the end portions 15a by screws 20 I provide a motor clamping or mounting block 25, which preferably, although not necessarily, is made of wood. The motor M, which has the conventional C-clamp members C, is clamped onto the block 25 in the same manner that it would be clamped onto the end of a boat, with the motor proper being suspended between the wheels 6 and with the propeller shaft S projecting rearwardly in position overhanging the block 25, so that the propeller shaft may be conveniently used as a handle to push the dolly along the ground.

When the motor is so mounted on the dolly, it may be readily moved from one place to another without the necessity of lifting the weight of the motor, and when not being moved, the dolly will support the motor off the floor, while the portions 10 of the side bars provide a ground rest which engages the floor or ground to prevent the wheels from rolling. When it is desired to detach the motor from the dolly this may be readily and quickly done by releasing the clamp C, after which the dolly may be conveniently carried by hooking the U-shaped side bar portions over the side of the boat, or by hanging it by means of the ring 30 secured to the axle by a link 31.

I claim:

1. A dolly for an outboard motor comprising an axle, wheels on the axle, a pair of side bars secured at their inner ends to the axle, the outer ends of the bars being bent upwardly and backwardly to present U-shaped portions, and a clamping block secured endwise between said backwardly bent portions to receive the clamping element of an outboard motor.

2. A dolly for an outboard motor comprising an axle, wheels on the axle, a pair of side bars secured at their inner ends to the axle, the outer ends of the bars being bent convergently upwardly and backwardly to present U-shaped portions, and a clamping block secured endwise between said backwardly bent portions to receive the clamping element of an outboard motor.

3. A dolly for an outboard motor comprising a pair of parallel side bars whose outer ends are formed convergently upwardly and backwardly, a motor clamping block secured at its respective ends to the respective backwardly formed portions of the side bars, a transverse hole through the inner end of each side bar, an axle extending at its opposite ends through said respective holes, a nut threadedly mounted on each end of the axle and a wheel rotatably mounted on each end of the axle between said nut and the adjacent side bar.

ARMEDOS O. GEORGE.